(12) United States Patent
Lizin

(10) Patent No.: US 7,065,081 B2
(45) Date of Patent: Jun. 20, 2006

(54) TELECOMMUNICATION CARRIER PROCESSOR SUBSYSTEM WITH IN-BAND CONTROL AND ADDRESSING VIA CELL HEADER FIELDS

(75) Inventor: Gilbert Carlo Marie Lizin, Sambreville (BE)

(73) Assignee: Alcatel, Paris (FR)

( * ) Notice: Subject to any disclaimer, the term of this patent is extended or adjusted under 35 U.S.C. 154(b) by 944 days.

(21) Appl. No.: 09/882,044

(22) Filed: Jun. 18, 2001

(65) Prior Publication Data
US 2002/0001311 A1 Jan. 3, 2002

(30) Foreign Application Priority Data
Jun. 28, 2000 (EP) .................................. 00401853

(51) Int. Cl.
*H04L 12/28* (2006.01)
(52) U.S. Cl. ..................... 370/392; 370/474; 370/395.1
(58) Field of Classification Search ................ 370/392, 370/397, 470, 474, 471, 477, 395.1
See application file for complete search history.

(56) References Cited

U.S. PATENT DOCUMENTS

| | | | | |
|---|---|---|---|---|
| 5,414,701 A | * | 5/1995 | Shtayer et al. | 370/395.3 |
| 5,430,720 A | | 7/1995 | Larsson et al. | 370/60 |
| 5,481,687 A | * | 1/1996 | Goubert et al. | 711/212 |
| 5,546,387 A | | 8/1996 | Larsson et al. | 370/60 |
| 5,555,256 A | * | 9/1996 | Calamvokis | 370/399 |
| 5,936,959 A | * | 8/1999 | Joffe | 370/397 |
| 6,034,958 A | * | 3/2000 | Wicklund | 370/395.32 |
| 6,046,996 A | * | 4/2000 | Hoshino et al. | 370/392 |
| 6,064,674 A | * | 5/2000 | Doidge et al. | 370/398 |
| 6,151,318 A | * | 11/2000 | Woodward et al. | 370/392 |
| 6,289,014 B1 | * | 9/2001 | Hoshino et al. | 370/392 |
| 6,356,552 B1 | * | 3/2002 | Foglar | 370/395.1 |
| 6,483,838 B1 | * | 11/2002 | Ostman et al. | 370/395.31 |
| 6,510,156 B1 | * | 1/2003 | Brock et al. | 370/395.1 |
| 6,556,570 B1 | * | 4/2003 | Delattre et al. | 370/395.31 |
| 6,618,397 B1 | * | 9/2003 | Huang | 370/474 |
| 6,657,997 B1 | * | 12/2003 | Lide et al. | 370/356 |
| 6,700,888 B1 | * | 3/2004 | Jonsson et al. | 370/392 |

(Continued)

FOREIGN PATENT DOCUMENTS

EP 0 843 500 A2 5/1998

(Continued)

*Primary Examiner*—Chieh M. Fan
*Assistant Examiner*—Steven Blount
(74) *Attorney, Agent, or Firm*—Sughrue Mion, PLLC

(57) ABSTRACT

A telecommunication carrier processor subsystem (CPS) adapted to receive cells (1, 2), preferably ATM cells, and to derive from the H-bit header field thereof a smaller set of R bits. The set of R bits is not only used to route the cell to a predetermined output of the subsystem but is also combined with a second set of D bits for replacing the VPI/VCI bits in the H-bit header field of the cell. The second set of D bits may be used for transmitting information data such as user data, control or command transmission. It may also be used for hand-over process or cell duplication and is then particularly suited for broadband local access applications relating to low earth orbit satellite constellations. Preserving the global ATM cell header size while using the freed D bits after changing the connection identifier range is called in-band control. It allows using off the shelf components for the cell transmission between sub-systems, boards or components. It also leads to the reduction of Connection Data Tables in coherence with the dimensioning required for a processing unit.

20 Claims, 4 Drawing Sheets

U.S. PATENT DOCUMENTS

| | | | |
|---|---|---|---|
| 6,791,963 B1 * | 9/2004 | Hwang et al. | 370/342 |
| 6,850,527 B1 * | 2/2005 | Moniot | 370/399 |
| 6,967,964 B1 * | 11/2005 | Svanbro et al. | 370/437 |
| 2001/0025321 A1 * | 9/2001 | Tang et al. | 709/246 |

FOREIGN PATENT DOCUMENTS

| | | |
|---|---|---|
| EP | 0 862 117 A1 | 9/1998 |
| EP | 0 862 348 A1 | 9/1998 |

* cited by examiner

TELECOMMUNICATION CARRIER PROCESSOR SUBSYSTEM WITH IN-BAND CONTROL AND ADDRESSING VIA CELL HEADER FIELDS

BACKGROUND OF THE INVENTION

The present invention relates to a telecommunication carrier processor subsystem having an input and a plurality of outputs and being adapted to receive, at said input, telecommunication cells each comprising a payload field and a H-bit header field, said subsystem including telecommunication interface means having an interface input corresponding to said input and a plurality of outlets each coupled to distinct ones of said outputs, said telecommunication interface means including header detection means connected to said input and routing means connected to said input, to said plurality of outlets and controlled by said header detection means, said header detection means being adapted to derive a R-bit connection identifier from at least a portion of the set of H bits contained in said header field, R and H being integer numbers with R smaller than H.

In the frame of low earth orbit satellite constellations providing broadband local access solutions, the use of telecommunication cells is well suited for the transport of multimedia services. The cells permit to establish end-to-end connections between, e.g., a transmitting external telecommunication exchange or network coupled to the input and terminals. These connections are possible via earth stations comprising the telecommunication carrier processor subsystem, modems and terrestrial antenna stations. The cells are so transferred via satellites coupling the outlets of the telecommunication interface means to the terminals.

To transmit a cell from the input to a predetermined outlet, the routing means uses routing information that is generally extracted from the H bits contained in the header filed of the cell. However, the number of possible outlets and the number of connections that the terminals coupled to these outlets can handle represents only a part of the permitted number of connections that may be indicated by H bits. This limited part may for instance be represented by a set of R bits, where R is smaller than H. Due to other considerations, it is an unsuitable constraint to split the range indicated by the H bits into equal and contiguous fractions only to solve implementation problems. As a consequence, an interfacing device or header detection means is needed to derive the R bits of "useful" routing information from the H bits of "full" routing information contained in the header field of the cell.

Such a header detection means is already known in the art, e.g. from the European Patent Application EP-A1-0 862 348 entitled "Interfacing device to extract M sets of bits out of N sets of bits, control unit and logical cell". As indicated in that document, the known header detection means or interfacing device is particularly useful when several data-handling units are connected to the outlets of a telecommunication interface means and different ones of these data-handling units can be addressed by only a portion of the data entering simultaneously at the input of the device. This is for instance so when the incoming sets of data bits are ATM [Asynchronous Transfer Mode] cells containing, in their header field, information of which only a portion is needed to further handle the cell. The known interfacing device may thus be used to reduce the number of H bits contained in the header field of a cell into a set of R bits sufficient to control the routing of the cell through the telecommunication interface means. According to the known document, such a set of R bits is then applied as a pointer to a RAM [Random Access Memory] of which the output is a connection identifier that controls the telecommunication interface means.

The output cell provided at an outlet of the telecommunication interface means is then either the former full cell (payload and header) received at the input but associated to the connection identifier issued from the RAM memory, or only the payload field of the former cell associated to this connection identifier. In any case, the length, i.e. the number of bits, of a cell at an outlet of the telecommunication interface means differs from the length of the former cell received at the input thereof.

Because the cells at the input generally have a standardized format, e.g. ATM cells, the design of specific apparatus able to manipulate non-standardized cell formats is required at the outlets of the telecommunication interface means. As a result, the development of a telecommunication carrier processor subsystem is relatively expensive and complex.

SUMMARY OF THE INVENTION

An object of the present invention is to provide a telecommunication carrier processor subsystem of the above known type but wherein the development cost and complexity of the subsystem and associated devices are reduced.

According to the invention, this object is achieved due to the fact that said routing means are adapted to transmit a cell from said input to at least one predetermined outlet of said plurality of outlets according to said R-bit connection identifier received from said header detection means, and to replace, into the header field of said cell, said set of H bits by a second set of H bits including the set of R bits constituting said connection identifier.

In this way, the global cell size or length of a cell at an outlet of the routing means and thus also at the outlet of the telecommunication interface means is identical to the length of a cell received at the input thereof. As a consequence, if normalized cells are applied at the input, normalized cells are also provided at the outlets and standard components, devices and equipments may be used to handle the cells inside and outside the telecommunication carrier processor subsystem. This reduces the cost and the complexity while increasing the performances and generally saving power consumption.

Moreover, the R bits derived from a portion of the former H-bit header and constituting the connection identifier are used both to control the routing means and to give, to further devices, indications about the cell. The former set of H bits contained in the input cell is indeed in most applications no longer necessary for the further processing of the cell.

Another characterizing embodiment of the present invention is that said telecommunication interface means further includes header combination means coupled to said header detection means and to said routing means and adapted to combine a set of D bits of information data with said set of R bits received from said header detection means into said second set of H bits for replacing the first mentioned set of H bits contained in said header field, D being an integer number smaller or equal to the difference between H and R.

The bits freed in the header field of a cell by replacing the former portion of the set of H bits by a smaller set of R bits, may be used for other purposes than routing without affecting the above mentioned advantages of the invention. The portion_of_H minus R=D freed bits are here preferably re-used for transmitting information data such as user data, control or command transmission, and this without changing the global cell size. This last capability is called "in-band control".

In a preferred embodiment of the present invention, said telecommunication cells are Asynchronous Transfer Mode [ATM] cells.

The format of the cells is thus fully standardized whereby standard equipment practice is applicable.

Also another characterizing embodiment of the present invention is that said carrier processor subsystem further includes a plurality of carrier processor means each having an inlet connected to an outlet of said telecommunication interface means and an output corresponding to an output of said carrier processor subsystem, each carrier processor means being adapted to transmitted or not to said output a cell received at said inlet according to at least a portion of the information data included in said set of D bits.

The carrier processor means is an interface between the telecommunication interface means and the above-mentioned satellites. To handle the traffic there between, one of the tasks of a carrier processor means or earth station is to map the telecommunication cells onto a functional MAC [Medium Access Control] sub-layer. Another task of the carrier processor means, together with the telecommunication interface means, is to handle the hand-over from one satellite to another. Indeed, in these low earth orbit satellite constellation contexts, a telecommunication connection path may change during the connection life. When a satellite disappears, the traffic must be handed-over to a new upcoming satellite. The cells transmitted by a carrier processor means dealing with the first satellite have then to be re-routed to another carrier processor means communicating with the rising satellite. For that operation there is a need to switch in real time the path followed by the cells between carrier processors means. Furthermore, together with the telecommunication interface means, the carrier processor means may also be used to duplicate cells toward several outputs. In any case, owing to the use of some or all the bits of the set of D bits received with the cell, the path switch or the connection duplication is done properly, i.e. without any cell lost and without any cell sequence perturbation.

In more detail, yet another characterizing embodiment of the present invention is that each carrier processor means of said plurality includes parameter detection means connected to said inlet and carrier mapping means connected to said inlet, to said output and to an output of said parameter detection means, said parameter detection means being adapted to extract said second set of H bits contained in the header field of a cell received at said inlet, to translate said second set of H bits into a set of M bits and to transmit said set of M bits to said carrier mapping means.

Further characterizing embodiments of the present are mentioned in the appended claims.

It is to be noticed that the term 'comprising', used in the claims, should not be interpreted as being restrictive to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restrictive to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein:

DETAILED DESCRIPTION OF THE INVENTION

Figure 1:
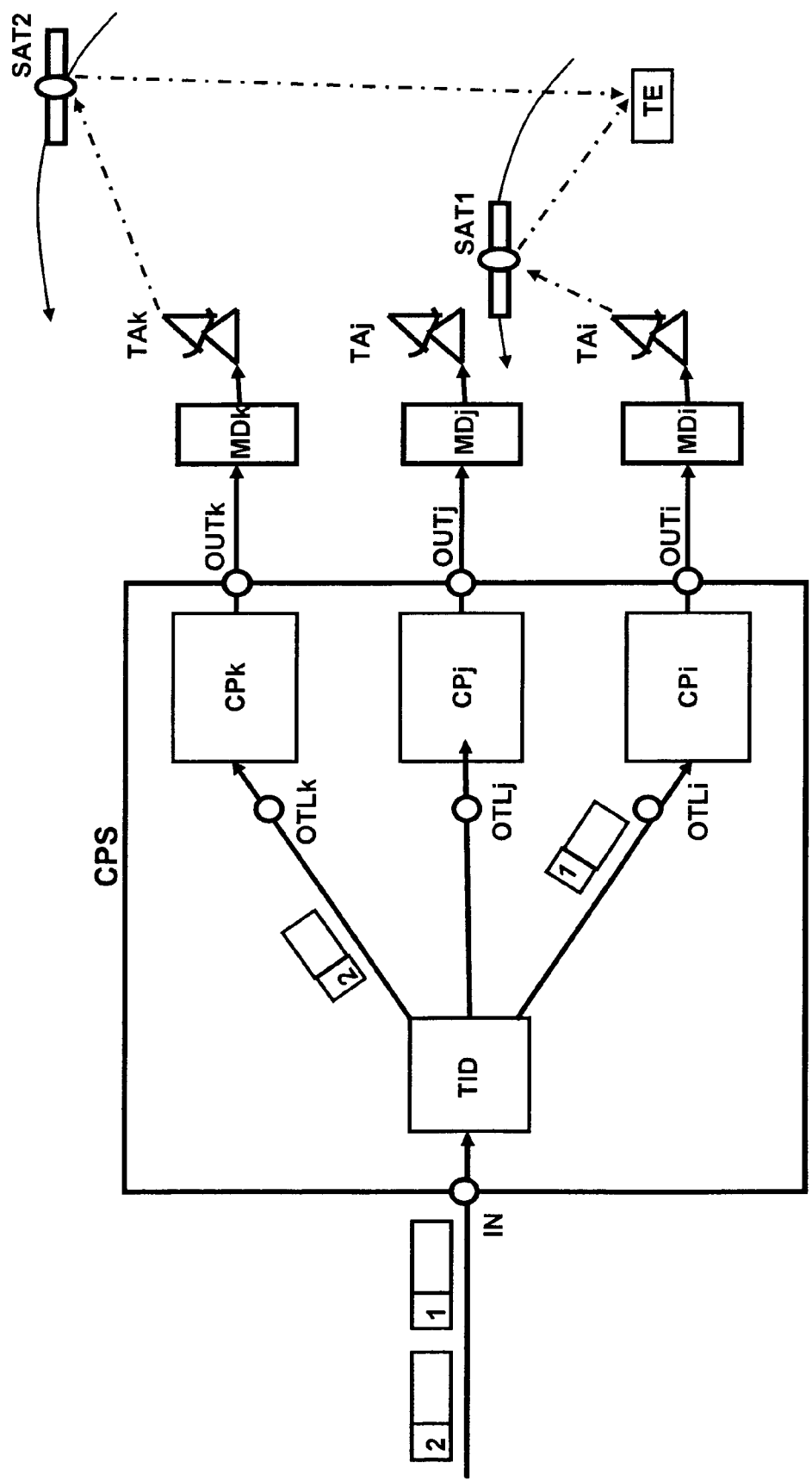
FIG. 1 represents a carrier processor subsystem CPS according to the invention and adapted to transmit telecommunication cells to a terminal TE via a low earth orbit satellite constellation.

The telecommunication carrier processor subsystem CPS shown at FIG. 1 forms part of a gateway of a broadband telecommunication local access network. The telecommunication access network receives cells from an external telecommunication network or exchange (not shown) and transmits them to terminals via the carrier processor subsystem CPS and a low earth orbit satellite constellation. The carrier processor subsystem CPS has an input IN coupled to the external network for receiving cells, as 1 and 2, thereof and has several outputs, of which only three OUTi, OUTj and OUTk are shown. The outputs OUTi, OUTj and OUTk are connected to terrestrial antenna stations TAi, TAj and TAk via respective modems MDi, MDj and MDk. The terrestrial antenna stations TAi, TAj and TAk are adapted to communicate with terminals, such as TE, via satellites of the constellation. Although only two satellites SAT1 and SAT2 are shown at FIG. 1, a low earth orbit satellite constellation contains for instance 66 satellites each moving according to a predetermined trajectory. The operation of the terrestrial antenna stations TAi, TAj and TAk, of the modems MDi, MDj and MDk, of the satellites SAT1 and SAT2, and of the terminal TE will not be described in more detail hereafter because it is supposed to be known by any person normally skilled in the art.

The carrier processor subsystem CPS includes a telecommunication interface device TID and several carrier processor units, of which only three CPi, CPj and CPk are shown. The telecommunication interface device TID has an input IN connected to the like-named input of the subsystem and several outlets OTLi, OTLj and OTLk each connected a like-named inlet of a corresponding carrier processor unit CPi, CPj and CPk. Each carrier processor unit further has an output connected to a corresponding output of the subsystem CPS.

The telecommunication cells 1, 2 applied to the input IN of the carrier processor subsystem CPS preferably have a standardized format and are for instance of the ATM [Asynchronous Transfer Mode] type. The ATM technology is well suited for the transport of multimedia services in the present case of low earth orbit satellite constellations providing broadband local access solutions. In this context of satellites, an ATM connection path is not unchanging during the connection life. When a satellite, say SAT1, disappears, i.e. with it becomes unreachable for the carrier processor subsystem CPS and more particularly for the terrestrial antenna stations TAi thereof or for the considered terminal TE, the traffic to the terminal TE must be handed-over to a new upcoming satellite, say SAT2. All the ATM cells of this traffic have then to be re-routed in real time from the carrier processor unit CPi dealing with the satellite SAT1 to the carrier processor unit CPk communicating with the rising satellite SAT2. The operation to switch in real time the path followed by the ATM cells 1, 2 between carrier processor units CPi and CPk is performed by the telecommunication interface device TID.

Figure 2:
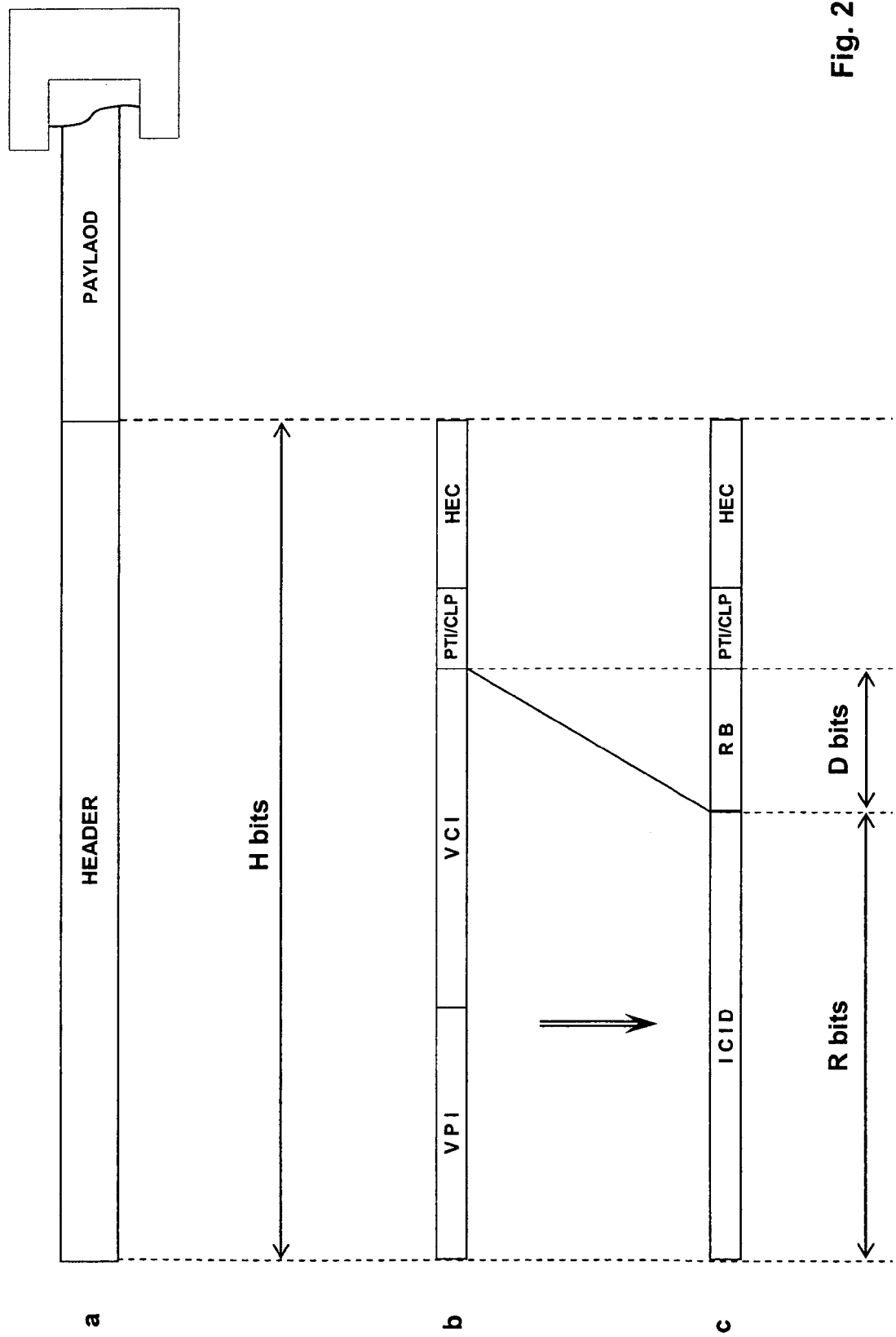
FIGS. 2a to 2c show contents of the header field of a cell used in the carrier processor subsystem CPS of FIG. 1.

An ATM cell has a length or global size of 53 bytes and comprises a header field and a payload field as shown at FIG. 2a. As shown at FIG. 2b, the header has a predetermined length, say of H bits, and comprises, amongst other, a Virtual Path Identifier VPI and a Virtual Channel Identifier VCI that identify an ATM connection, e.g. the destination address of the terminal TE to which the cell is intended. Depending the type of ATM interface used, the complete range of the VPI/VCI identifiers permits either $2^{8+16}=16\,777\,216$ (in case of User-Network Interface) or $2^{12+16}=268\,435\,456$ (in case Network-Node Interface) values. However, due to the available implementation technology and/or the product requirements, a carrier processor unit, as CPi, can only handle a part of this number of possible connections. The limited number of connections, say for instance $2^R$, may be taken anywhere in the ATM connection identifier range given by VPI/VCI and will be called Internal Connection Identifier ICID as shown at FIG. 2c. The value R will be chosen smaller than 24 or 28 depending on the interface type. For R=16, the gain in size is of $2^{12+16}-2^R=268\,369\,920$ values removed. Further in this description, we will generally consider that only the portion of the header comprising the VPI/VCI fields is taken into account and that the Internal Connection Identifier ICID has a length of R bits, where R is an integer value smaller than the considered portion of H bits of the header. The remaining part of this portion of the H bits, say RB that is a set of D free bits with D=portion_of_H–R, may be used for other purposes such as hand-over process or cell duplication as will be explained later.

Figure 3:
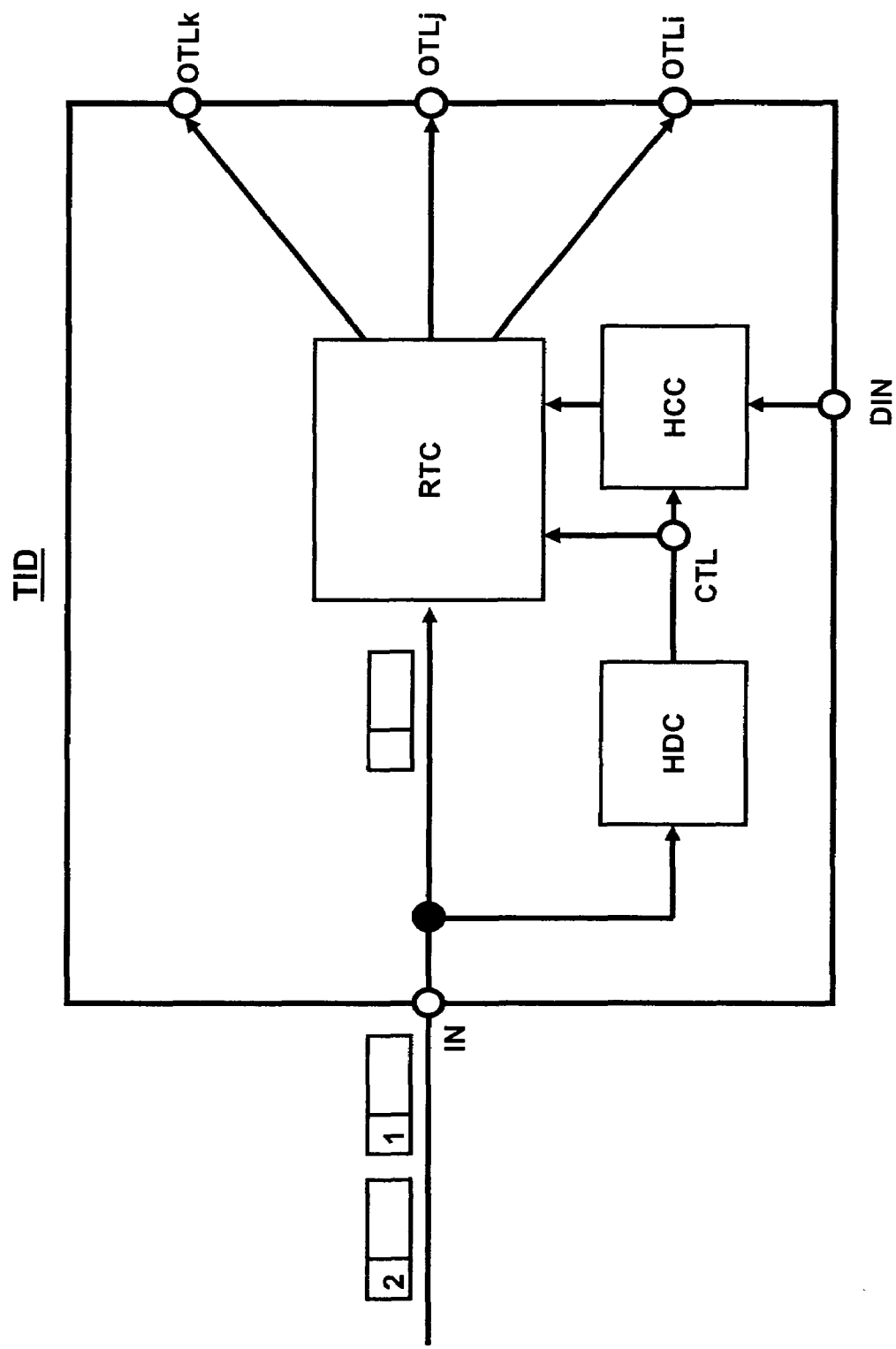
FIG. 3 represents in more detail a telecommunication interface device TID forming part of the carrier processor subsystem CPS of FIG. 1.

The telecommunication interface device TID will be described in more detail hereafter by making reference to FIG. 3. TID includes a routing circuit RTC having an input IN connected to the like-named input of the subsystem CPS and is adapted to route the incoming cell to one (or more) of the outlets OTLi, OTLj or OTLk of TID. This routing is performed under control of a header detection circuit HDC also included in the interface device TID. The header detection circuit HDC also has an input IN connected to the like-named input of TID and an output CTL connected to a like-named control input of the routing circuit RTC. HDC is adapted to read the set of H bits contained in the header field of an incoming cell and to derive from there the set of R bits corresponding to the above internal connection identifier ICID. Due to ATM considerations, it is generally not sufficient to simply split the VPI/VCI range of the set of H bits into equal and/or contiguous fractions only to solve implementation problems. Very often, connection data tables with the necessary ATM connection range are required inside the header detection circuit HDC. However, owing to the reduction from the portion VPI/VCI of the H bits to R bits, board space is saved anyway in the HDC, as a consequence of which the power consumption is also reduced. The operation of deriving the set of R bits from the set of H bits is not described in more detail hereafter since such an operation is for instance already explained in the above-mentioned European Patent Application EP-A1-0 862 348. It is for instance performed by means of a routing table included in the header detection means HDC and having as input the portion VPI/VCI of the H bits header and as output the set of R bits constituting the internal connection identifier ICID.

The R bits identifier ICID received by the routing circuit RTC via its control input CTL is used to select a particular one of its outlets. RTC further also replaces, in the header field of the cell, the former set of H bits with a new set of H bits wherein the portion VPI/VCI now comprises the set of R bits provided by the header detection means HDC and the above set of D bits. The global size or length of the cell at the outlet of the routing circuit RTC is thus not modified and this last capability is named in-band control. As a result thereof, standard components and devices may be used to handle the cells all through the carrier processor subsystem CPS.

The telecommunication interface device TID also comprises a header combination circuit HCC having an input connected to the output CTL of the header detection circuit HDC and an output coupled to an input of the routing circuit RTC. The header combination circuit HCC has another input DIN, external to the interface device TID, and to which external information data may be applied. This information data is intended to be loaded into the set of D bits in the header field of the cell. The merging of the set of R bits and the set of D bits into a new portion, and thus a new set, of H bits of the header field occurs in the routing circuit RTC.

Figure 4:
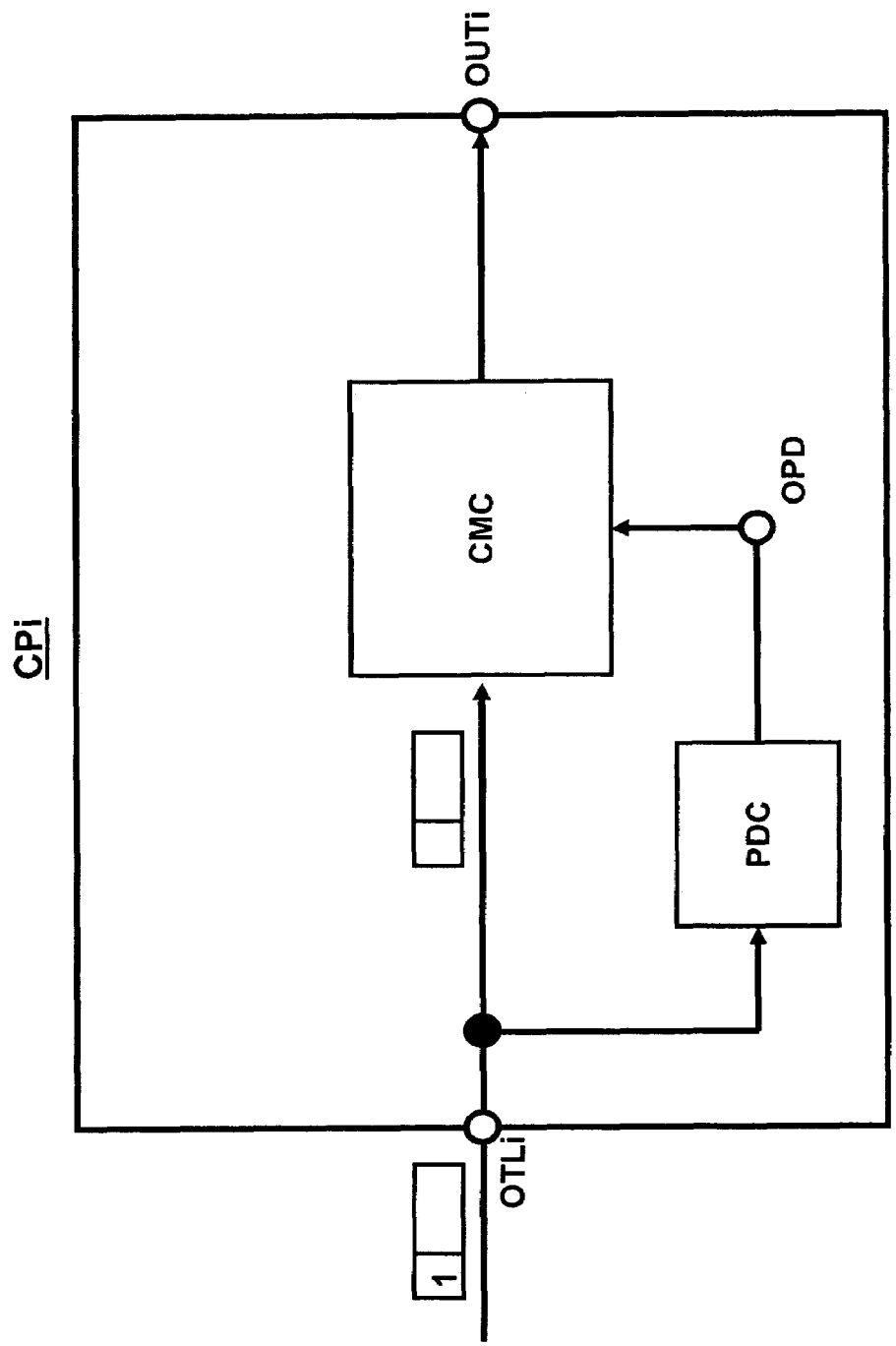
FIG. 4 represents in more detail one of the carrier processor devices CPi forming part of the carrier processor subsystem CPS of FIG. 1.

From the outlets OTLi, OTLj and OTLk of the routing circuit RTC, and thus also of the interface device TID, the cells are transmitted to like-named inlets of the carrier processor units CPi, CPj and CPk respectively. One of these carrier processor units, say CPi, is represented at FIG. 4. CPi includes a carrier mapping circuit CMC having an inlet OTLi connected to the like-named inlet of CPi and an output OUTi connected to the like-named output of CPi, OUTi being also an output of the telecommunication carrier processor subsystem CPS. The carrier processor unit CPi further comprises a parameter detection circuit PDC having an inlet OTLi connected to the like-named inlet of CPi and an output OPD connect to a like-named control input of the carrier mapping circuit CMC. The parameter detection circuit PDC is adapted to extract the set of H bits contained in the header field of the cell received at the inlet OTLi, to translate this set into another set of M bits and to transmit the new set of M bits to the carrier mapping circuit CMC via the output OPD.

To handle the telecommunication traffic, one of the tasks of an earth station or more particularly of a carrier mapping circuit CMC is to map the ATM cells onto a functional MAC [Medium Access Control] sub-layer. To this end, the carrier mapping circuit CMC of the carrier processor unit CPi replaces, in the header field of the received cell, the set of H bits by a set of M bits compatible with the Medium Access Control protocol used by the carrier processor subsystem CPS. The modified cell is then transmitted to the output OUTi of CPS.

The above part RB of the header field containing D liberated bits may be used for switching between carrier processor units or for duplication purpose.

In case of switching, e.g. to change of satellite connection, one or more of the freed D bits are used as in-band control. For example, one of the D bits is used as a Switch Bit Flag SWF (not shown). Suppose an existing connection whereby the cells, say cell 1 as referring to FIG. 1, follow an initial path from the output OTLi of the telecommunication interface device TID to the like-named inlet of the carrier processor unit CPi. As long as SWF=0, nothing is changing this state. When a hand-over time occurs, e.g. just before the satellite SAT1 disappears and when SAT2 becomes reachable, the connection must proceed through the carrier processor unit CPk rather than through CPi. The switch bit flag SWF is then activated, i.e. SWF=1. The carrier processor unit CPi is thereby informed that it must now discard the incoming cells of this connection, whilst the carrier processor unit CPk is informed that it must now take in charge such cells. The cells of the connection, say cell 2, now follow the new path via the output OTLk.

As already mentioned, the present carrier processor subsystem CPS and more particularly its telecommunication interface device TID is also adapted to duplicate the ATM cells toward several carrier processor units without any cell lost and without any cell sequence perturbation.

In this case of duplication, a Duplication Bit Flag DPF (not shown) belonging to the set of D bits is used. By receiving the DPF bit, the carrier processor unit CPi do not change anything in its behavior, while the carrier processor unit k reacts exactly as for the switch bit flag SWF. The operation may be repeated n times in order to establish n+1 paths for a particular connection. The duplication application controlled by the set of D bits in the ATM cell header may be also useful in case of a hand-over anticipation procedure or in case of broadcast connections.

It is to be noted that, for instance for another application, the carrier processor unit CPi is also adapted to translate the internal connection identifier ICID again to the correct VPI/VCI value identical or not to the original one. This solution is also applicable only on the VPI field, e.g. when an access node has to be transparent for the VCI.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A telecommunication carrier processor subsystem having an input and a plurality of outputs and receiving, at said input, telecommunication cells each comprising a payload field and a H-bit header field, said subsystem comprising:
   telecommunication interface means having an interface input corresponding to said input and a plurality of outlets each coupled to distinct ones of said outputs, said telecommunication interface means comprising:
   header detection means connected to said input, said header detection means deriving a R-bit connection identifier from at least a portion of the set of H bits contained in said header field, R and H being integer numbers with R smaller than H,
   routing means connected to said input and to said plurality of outlets and controlled by said header detection means, wherein said routing means transmits a cell from said input to at least one predetermined outlet of said plurality of outlets according to said R-bit connection identifier received from said header detection means, and replaces, into the header field of said cell, said set of H bits by a second set of H bits comprising the set of R bits constituting said connection identifier, and
   header combination means, coupled to said header detection means and to said routing means, for combining a set of D bits with said set of R bits received from said header detection means into said second set of H bits, D being an integer number smaller or equal to a difference between H and R, wherein a portion of said set of D bits is used for command data associated with said payload field.

2. The telecommunications carrier processor subsystem according to claim 1, wherein said header detection means comprises a routing table having as input said portion of the set of H bits contained in said header field and as output said set of R bits constituting said connection identifier.

3. The telecommunications carrier processor subsystem according to claim 1, wherein said telecommunication cells are Asynchronous Transfer Mode cells.

4. The telecommunications carrier processor subsystem according to claim 1, wherein said carrier processor subsystem further comprises a plurality of carrier processor means each having an inlet connected to an outlet of said telecommunication interface means and an output corresponding to an output of said carrier processor subsystem, each carrier processor means being configured to transmit to said output a cell received at said inlet or to block transmission of said cell to said output according to said command data included in said set of D bits.

5. The telecommunications carrier processor subsystem according to claim 4, wherein each carrier processor means comprises parameter detection means connected to said inlet and carrier mapping means connected to said inlet, to said output and to an output of said parameter detection means, said parameter detection means extracting said second set of H bits contained in the header field of a cell received at said inlet, to translate said second set of H bits into a set of M bits and transmitting said set of M bits to said carrier mapping means.

6. The telecommunications carrier processor subsystem according to claim 5, wherein each of said carrier mapping means replaces, in the header field of said cell, said second set of H bits by said set of M bits, prior to transmit said cell to said output.

7. The telecommunications carrier processor subsystem according to claim 1, wherein the command data included in said set of D bits comprises at least one of user data, a command or a control transmission.

8. The telecommunications carrier processor subsystem according to claim 1, wherein the command data included in said set of D bits comprises a flag that commands at least one of the plurality of a carrier processor means to transmit said cell and commands at least one other of the plurality of carrier processor means to block transmission of said cell.

9. The telecommunications carrier processor subsystem according to claim 1, wherein the command data included in said set of D bits comprises a duplication flag that commands at least two of the plurality of a carrier processor means.

10. The telecommunications carrier processor subsystem according to claim 4, wherein at least one of the carrier processor means converts the R-bit connection identifier and said set of D bits into the original H-bit header field of the telecommunication cells.

11. A telecommunication carrier processor subsystem having an input and a plurality of outputs and receiving, at said input, telecommunication cells each comprising a payload field and a H-bit header field, said subsystem comprising:

a telecommunication interface comprising an interface input corresponding to said input and a plurality of outlets each coupled to distinct ones of said outputs, said telecommunication interface comprising:

a header detector connected to said input, said header detector deriving a R-bit connection identifier from at least a portion of the set of H bits contained in said header field, R and H being integer numbers with R smaller than H, a router connected to said input and to said plurality of outlets and controlled by said header detector, wherein said router transmits a cell from said input to at least one predetermined outlet of said plurality of outlets according to said R-bit connection identifier received from said header detector, and replaces, into the header field of said cell, said set of H bits by a second set of H bits comprising the set of R bits constituting said connection identifier, and a header combiner, coupled to said header detector and to said router, to combine a set of D bits with said set of R bits received from said header detector into said second set of H bits, D being an integer number smaller or equal to a difference between H and R, wherein a portion of said set of D bits is used for command data associated with said payload field.

12. The telecommunications carrier processor subsystem according to claim 11, wherein said header detector comprises a routing table having as input said portion of the set of H bits contained in said header field and as output said set of R bits constituting said connection identifier.

13. The telecommunications carrier processor subsystem according to claim 11, wherein said telecommunication cells are Asynchronous Transfer Mode cells.

14. The telecommunications carrier processor subsystem according to claim 11, wherein said carrier processor subsystem further comprises a plurality of carrier processors each having an inlet connected to an outlet of said telecommunication interface and an output corresponding to an output of said carrier processor subsystem, each carrier processor being configured to transmit to said output a cell received at said inlet or to block transmission of said cell to said output according to said command data included in said set of D bits.

15. The telecommunications carrier processor subsystem according to claim 14, wherein each carrier processor comprises a parameter detector connected to said inlet and a carrier mapper connected to said inlet, to said output and to an output of said parameter detector, said parameter detector extracting said second set of H bits contained in the header field of a cell received at said inlet, translating said second set of H bits into a set of M bits and transmitting said set of M bits to said carrier mapper.

16. The telecommunications carrier processor subsystem according to claim 15, wherein each of said carrier mappers replaces, in the header field of said cell, said second set of H bits by said set of M bits, prior to transmitting said cell to said output.

17. The telecommunications carrier processor subsystem according to claim 11, wherein the command data included in said set of D bits comprises at least one of user data, a command or a control transmission.

18. The telecommunications carrier processor subsystem according to claim 11, wherein the command data included in said set of D bits comprises a flag that commands at least one of a plurality of the carrier processors to transmit said cell and commands at least one other of the plurality of carrier processors to block transmission of said cell.

19. The telecommunications carrier processor subsystem according to claim 11, wherein the command data included in said set of D bits comprises a duplication flag that commands at least two of the plurality of a carrier processors.

20. The telecommunications carrier processor subsystem according to claim 14, wherein at least one of the carrier processors converts the R-bit connection identifier and said set of D bits into the original H-bit header field of the telecommunication cells.

* * * * *